US009407389B2

(12) United States Patent
Mizutani et al.

(10) Patent No.: US 9,407,389 B2
(45) Date of Patent: Aug. 2, 2016

(54) COMMUNICATION SYSTEM AND TIME SYNCHRONIZATION METHOD

(71) Applicant: Hitachi, Ltd., Tokyo (JP)

(72) Inventors: Masahiko Mizutani, Tokyo (JP); Hiroaki Nakazawa, Tokyo (JP); Yoshihiro Ashi, Tokyo (JP); Daiji Mitsunaga, Tokyo (JP); Hideyuki Nakanishi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 37 days.

(21) Appl. No.: 14/454,237

(22) Filed: Aug. 7, 2014

(65) Prior Publication Data

US 2015/0085852 A1 Mar. 26, 2015

(30) Foreign Application Priority Data

Sep. 24, 2013 (JP) ................................ 2013-197326

(51) Int. Cl.
*H04L 12/50* (2006.01)
*H04J 3/06* (2006.01)
*H04L 12/26* (2006.01)

(52) U.S. Cl.
CPC ............ *H04J 3/0667* (2013.01); *H04J 3/0673* (2013.01); *H04L 43/0852* (2013.01); *H04L 43/0858* (2013.01)

(58) Field of Classification Search
CPC .. H04J 3/0667; H04J 3/0673; H04L 43/0852; H04L 43/0858; H04L 49/1523; H04L 47/10; H04L 12/5602; H04L 47/27; H04L 2012/5635; H04L 47/35; H04L 47/30; H04L 47/32
USPC .................. 370/231, 235, 252, 402, 404, 405
See application file for complete search history.

(56) References Cited

U.S. PATENT DOCUMENTS

| | | | | |
|---|---|---|---|---|
| 6,215,772 | B1 * | 4/2001 | Verma | H04L 12/2697 370/231 |
| 8,254,260 | B1 * | 8/2012 | Bajpay | H04L 41/0627 370/235 |
| 8,942,140 | B2 * | 1/2015 | Baron | H04L 12/4625 370/252 |
| 2009/0067850 | A1 | 3/2009 | Mizutani et al. | |

FOREIGN PATENT DOCUMENTS

| | | |
|---|---|---|
| JP | 5122890 B2 | 11/2012 |

* cited by examiner

*Primary Examiner* — Brenda H Pham
(74) *Attorney, Agent, or Firm* — Volpe and Koenig, P.C.

(57) ABSTRACT

In an extensive distribution system with no delay guarantee network used as a relay network, an influence of a fluctuation of a communication delay time is avoided to conduct a high-precision time synchronization. First and second delay control devices installed in junctions between communication networks and a relay network, respectively, have functions of retaining first and second time information, and setting a first relay network passing time of a first communication signal directed from a time dissemination device toward a time receiving device through a relay network, and a second relay network passing time of a second communication signal directed from the time receiving device toward the time dissemination device, respectively. In measurement of communication delay time of the first communication network and the second communication network prior to time synchronization, the first and second relay network passing times are unified in advance to exclude uncertainty of the communication time.

4 Claims, 12 Drawing Sheets

DELAY CONTROL DEVICE 10
TIME PROCESSING UNIT 2510

DELAY CONTROL DEVICE 10
DELAY CONTROL UNIT 2810

DELAY TIME SETTING DB 12

601 602 603

| PATH IDENTIFIER (VLAN ID) | DELAY SETTING VALUE (msec) | COMMUNICATION DIRECTION |
|---|---|---|
| VID A | 0 | Send |
| VID B | 10000 | Recv |
| | | |

CORRESPONDING TO PATH 1101

CORRESPONDING TO PATH 1102

FIG.6

INTERNAL DELAY DB 2690

901 902 903

| PATH IDENTIFIER (VLAN ID) | INTERNAL DELAY SETTING VALUE (msec) | COMMUNICATION DIRECTION | |
|---|---|---|---|
| VID A | 2000 | Send | CORRESPONDING TO PATH 1101 |
| VID B | 0 | Recv | CORRESPONDING TO PATH 1102 |
| | | | |

FIG.9

DELAY TIME SETTING DB 20

| DEVICE IDENTIFIER (12001) | DELAY SETTING VALUE (msec) (12002) | COMMUNICATION DIRECTION (12003) | |
|---|---|---|---|
| 40 | 0 | Send | CORRESPONDING TO PATH 1101 |
| 40 | 10000 | Recv | CORRESPONDING TO PATH 1102 |
| 50 | 0 | Send | CORRESPONDING TO PATH 1103 |
| 50 | 20000 | Recv | CORRESPONDING TO PATH 1104 |

INTERNAL DELAY DB 2690

| DEVICE IDENTIFIER (12011) | INTERNAL DELAY SETTING VALUE (msec) (12012) | COMMUNICATION DIRECTION (12013) | |
|---|---|---|---|
| 40 | 2000 | Send | CORRESPONDING TO PATH 1101 |
| 40 | 0 | Recv | CORRESPONDING TO PATH 1102 |
| 50 | 5000 | Send | CORRESPONDING TO PATH 1103 |
| 50 | 0 | Recv | CORRESPONDING TO PATH 1104 |

FIG.12

COMMUNICATION SYSTEM AND TIME SYNCHRONIZATION METHOD

CLAIM OF PRIORITY

The present application claims priority from Japanese patent application JP 2013-197326 filed on Sep. 24, 2013, the content of which is hereby incorporated by reference into this application.

BACKGROUND OF THE INVENTION

1. Field of the Invention

The present invention relates to a communication system and a time synchronization method. The present invention relates particularly to a time dissemination system in a wide area or between remote locations which synchronizes a plurality of communication networks which are distributed and connected to each other through an arbitrary relay network with a single reference time server. Also, the present invention relates particularly to a communication system construction method for improving a time synchronization precision not depending on a geographical distance between the communication networks, and a signal processing method in a time control signal relay for avoiding the deterioration of a time synchronization precision associated with the indefiniteness of a communication quality between the communication networks (at the time of passing through the relay network).

2. Description of the Background Art

The internet is established as an infrastructure essential to business activities, and business data is routinely shared through the network. A sense of speed demanded for the business increases, and business operation that targets global markets is demanded more than ever before. As a result, not only backup of e-mails, web browsing, or business data, but also real-time information exchange between the remote locations through the network are increasingly required. For that reason, the enhancement of a data protection function and a further improvement in the communication quality are demanded for the network while growing data traffic is held.

In order to support real-time information sharing using voice speech or teleconference, there is a need to reduce a required data transfer time (hereinafter called “delay time”) in the case where the network is used. The diffusion of the network service based on the internet technique largely causes the data traffic to grow, and also a packet transport technique representative of an internet protocol (IP) or the Ethernet (registered in trademark) to be increasingly introduced. In order to apply a packet communication technique based on a best-effort system to a transport service provided by a communication carrier, the instability of the communication network must be reduced as much as possible. Under the circumstances, in order to improve the institution of troubleshooting or a condition monitoring, an operation, administration, and maintenance (OAM) technique and a time phase synchronization technique have been studied. In particular, in the time phase synchronization technique, its significance increases due to the rapid diffusion of mobile terminals. In order to respond to an increase in the users and an increase in the data traffic using the mobile terminals, phase synchronization among a plurality of base stations with high precision at the level of, for example, microsecond or lower is demanded. Further, time information is significant information determined in association with geographical conditions or the system specification, and associated closely with social life. A use method is conceivable in which an access time to electronic data is monitored with the use of commonality of that time to prevent falsification by a third party.

In order to use standard time information, in the related-art communication network, mainly, a standard time provision service using a network time protocol (NTP) is used, GPS receivers are installed in the respective communication networks, or time information is obtained with the use of a precision time protocol (PTP) prescribed in a standard such as IEEE 1588. The NTP represents a technique in which a standard time server (time source is a global positioning system (GPS), a standard wave, or an atomic clock) provided by an organization that manages a standard time such as National Institute of Information and Communications Technology (NICT) of Japan notifies general users of the standard time in response to a time dissemination request from client terminals such as PCs of the general users. The NTP has extensively been used in both of local area networks (LAN) and wide area networks (WAN). The precision of the NTP is about 1 millisecond, and the precision of the GPS is lower than 1 microsecond. In the NTP, the delay time (and fluctuation) of the network communication mainly causes the time synchronization precision to decrease. The IEEE 1588 PTP represents a technique in which the synchronization precision of nanosecond level is realized on condition that the PTP is mainly used in a LAN which can strictly manage the delay.

Japanese Patent No. 5122890 discloses a method for realizing the time phase synchronization with high precision between the remote locations. This publication discloses, “a transmission device creates a corrected value of the time information in each terminal device with the use of a reciprocating transmission delay time to the terminal device, and the time information of the transmission device, and transmits the corrected value. The terminal device includes information on an expected time of arrival based on the time information of the terminal device and the corrected value received from the transmission device in a frame to be transmitted toward the transmission device. The transmission device compares a receipt time of this frame with the expected arrival time information in the frame. If the receipt time is identical with the expected arrival time information, the transmission device synchronizes the time information of the terminal device with the time information of the transmission device. If not identical, the transmission device transmits a new corrected value to the terminal device. The terminal device transmits the frame including the expected arrival time information using the new corrected value to the transmission device. With the repetition of the above processing, the transmission device synchronizes the time of the terminal device with the time of the transmission device.” (refer to abstract). This is a method in which a communication device having the standard time information disseminates the time information to the plurality of terminal devices. In this example, a ranging process of a passive optical network (PON) is used for measurement of a required communication time (delay time) between the communication device and the terminal device, and a fluctuation of the delay time measured prior to the time dissemination is reduced to improve a precision of the time set in mobile units.

SUMMARY OF THE INVENTION

For example, in ticket booking or stock market in business dealing on the internet, processing is conducted in a sequence (that is, order arrival time) in which users’ orders arrive at a transaction server of stocks. Therefore, the transaction server must disclose market circumstances in real time, and it is desirable that a communication time between the user and the transaction server is reduced as much as possible to improve a response speed. It is necessary that the user and the transaction server are synchronized in time with each other with high precision. In order to synchronize a phase between the base stations, a communication carrier that operates a mobile backhaul needs an extensive time synchronization network with high precision. Also, in general, when a company or a municipality has a plurality of relevant sites, and each of the sites is distributed, high-precision synchronization between the distributed sites is demanded to be established from the viewpoint of a business necessity such as the above-mentioned network management or a conference application.

In the related-art time information dissemination system, the NTP is used for the purpose of synchronizing time between the distributed communication networks. However, in recent years, in order to response to a precision requirement of millisecond level or higher, a method of time-synchronizing devices within a packet network with each other together with the client terminals with the use of IEEE 1588 PTP is mainstream. However, because errors of the communication delay quantity and the time set value are enlarged due to the communication delay within the relay network and its instability, it is difficult to use the PTP for time synchronization in the extensive distribution system. In particular, a severe inconsistency is found in the availability and the possibility of the PIP in a case where a network using a conventional layer-2 switch or an IP router which is increasingly introduced as a social infrastructure with no delay guarantee is used as the relay network. The error and the instability are affected by the inconsistency more as the communication distance is longer, and the number of relay devices is larger.

The present invention is made in view of the above circumstance, and an object of the present invention is to realize a high-precision time synchronization using the PTP between the devices such as mobile base stations distributed in an wide area, or between distributed bases connected to each other through the communication carrier or a network such as an internet service provider (ISP) network.

According to the first solving means of the present invention, there is provided a communication system comprising:

a first communication network including a time dissemination device;

a second communication network including a time receiving device;

a relay network that is connected to the first communication network and the second communication network, and relays communication signals of the first communication network and the second communication network;

a first delay control device that is disposed at a first interconnection point that connects the first communication network and the relay network;

a second delay control device that is disposed at a second interconnection point that connects the relay network and the second communication network; and a high-precision time source that sets the same time information for the first delay control device and the second delay control device, wherein, when the first delay control device receives a first communication signal which is a delay time measurement signal in a forward path extending from the time dissemination device toward the time receiving device through the relay network, the first delay control device inserts a reception time into the first communication signal as a first reception time, and transfers the first communication signal, the second delay control device, according to a second reception time at which the first communication signal is received, the first reception time extracted from the first communication signal, and a predetermined first delay setting value, obtains a first wait time from a difference between the first delay setting value, and a time difference between the second reception time and the first reception time, when the second delay control device receives a second communication signal which is a delay time measurement signal in a return path extending from the time receiving device toward the time dissemination device, the second delay control device inserts a reception time into the second communication signal as a third reception time, and transfers the second communication signal, the first delay control device, according to a fourth reception time at which the second communication signal is received, the third reception time extracted from the second communication signal, and the same first delay setting value as that of the first communication signal, obtains a second wait time from a difference between the first delay setting value, and a time difference between the fourth reception time and the third reception time, and the first delay control device and the second delay control device conduct a delay control of packet transfer by the second wait time and the first wait time, respectively, to transmit the communication signals in the same delay time as the first delay setting value in the forward path and the return path.

According to the second solving means of the present invention, there is provided a time synchronization method in a communication system, the communication system comprising:

a first communication network including a time dissemination device;

a second communication network including a time receiving device;

a relay network that is connected to the first communication network and the second communication network, and relays communication signals of the first communication network and the second communication network;

a first delay control device that is disposed at a first interconnection point that connects the first communication network and the relay network;

a second delay control device that is disposed at a second interconnection point that connects the relay network and the second communication network; and a high-precision time source that sets the same time information for the first delay control device and the second delay control device, wherein, when the first delay control device receives a first communication signal which is a delay time measurement signal in a forward path extending from the time dissemination device toward the time receiving device through the relay network, the first delay control device inserts a reception time into the first communication signal as a first reception time, and transfers the first communication signal, the second delay control device, according to a second reception time at which the first communication signal is received, the first reception time extracted from the first communication signal, and a predetermined first delay setting value, obtains a first wait time from a difference between the first delay setting value, and a time difference between the second reception time and the first reception time, when the second delay control device receives a second communication signal which is a delay time measurement signal in a return path extending from the time receiving device toward the time dissemination device, the second delay control device inserts a reception time into the second communication signal as a third reception time, and transfers the second communication signal, the first delay control device, according to a fourth reception time at which the second communication signal is received, the third reception time extracted from the second communication signal, and the same first delay setting value as that of the first communication signal, obtains a second wait time from a difference between the first delay setting value, and a time difference between the fourth reception time and the third reception time, and the first delay control device and the second delay control device conduct a delay control of packet transfer by the second wait time and the first wait time, respectively, to transmit the communication signals in the same delay time as the first delay setting value in the forward path and the return path.

According to the present invention, it is possible to realize a high-precision time synchronization using the PTP between the devices such as mobile base stations distributed in an wide area, or between distributed bases connected to each other through the communication carrier or a network such as an internet service provider (ISP) network.

BRIEF DESCRIPTION OF THE DRAWINGS

FIG. 6 is a table configuration diagram illustrating a set example of a delay time setting DB retained in the delay control device;

FIG. 9 is a table configuration diagram illustrating a set example of an internal delay DB in the delay control device;

FIG. 12 is a table configuration diagram illustrating a set example of a delay time setting DB and an internal delay DB in the delay control device.

DETAILED DESCRIPTION OF THE EMBODIMENTS

Hereinafter, embodiments of the present invention will be described with reference to the accompanying drawings.

1. Outline

In the present invention or this embodiment, in a communication system that conducts time dissemination on an information processing device belonging to a second communication network connected through a relay network such as the internet which cannot conduct a delay guarantee from a time dissemination device belonging to a first communication network, a first delay control device is provided in a junction between the first communication network and the relay network, and a second delay control device is provided in a junction between the second communication network and the relay network, the first and second delay control devices have a function of distinguishing a first communication signal directed from the information dissemination device toward a terminal device through the relay network, and a second communication signal directed from the terminal device toward the information dissemination device from other communication signals within the relay network, respectively, a function of retaining the first and second time information, respectively, and a function of controlling a first communication time since the first communication signal received from the first communication network passes through the relay network until the first communication signal passes through the second delay control device, and a second communication time since the second communication signal received from the second communication network passes through the relay network until the second communication signal passes through the first delay control device, and in a state where the first communication time and the second communication time are set to the same time, a setting time notification from a time dissemination server (within the first communication network) toward an information processing device (within the second communication network) can be conducted on the basis of a required communication time between the first and second communication networks measured through the first and second delay control devices.

2. System and Time Synchronization

First Embodiment

In this embodiment, a description will be given of a fundamental communication system configuring method and a signal processing method for time-synchronizing a plurality of communication networks installed geographically distant from each other with each other with a slight error of microsecond or lower, with high precision.

Figure 1:
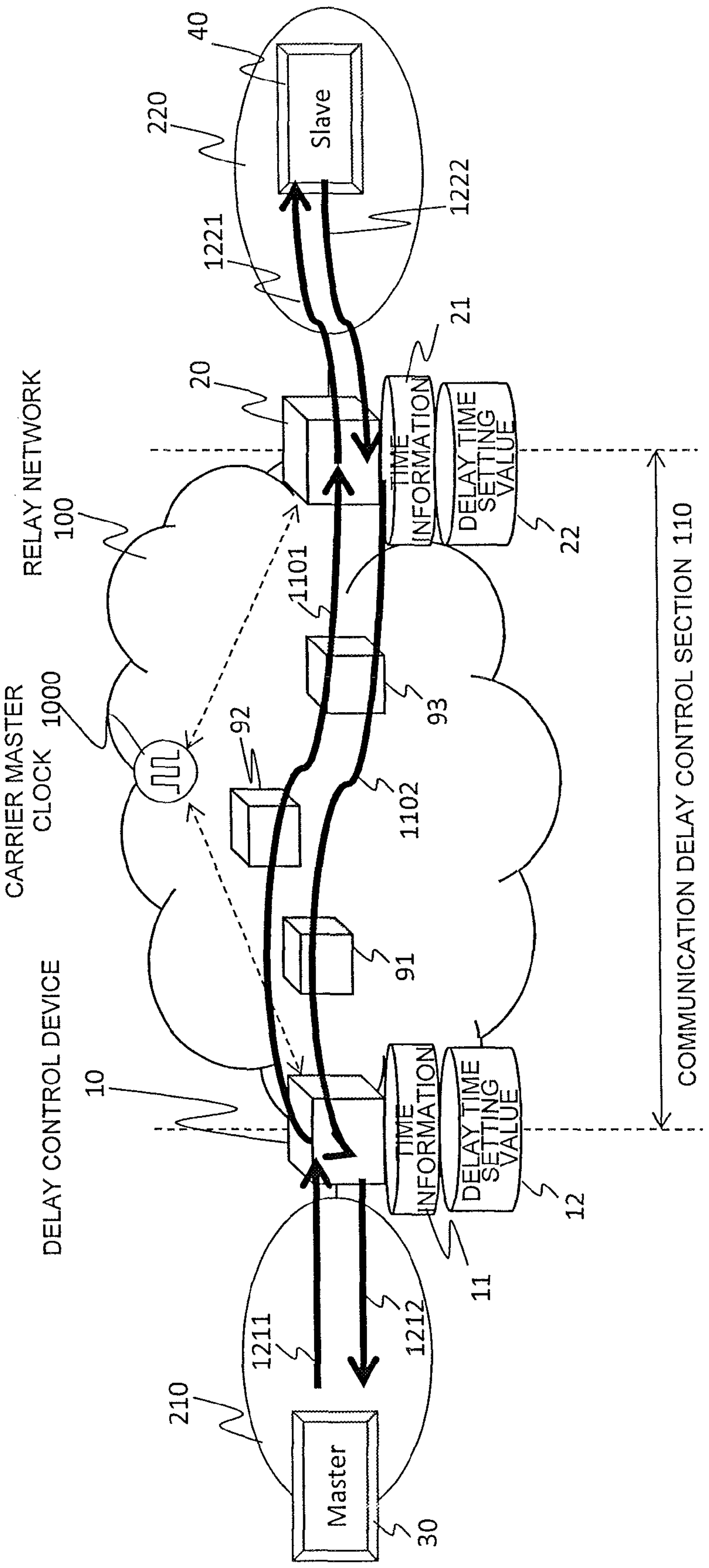
FIG. 1 is a network configuration diagram illustrating a communication system configuration and a communication time measurement method according to a first embodiment.

FIG. 1 is a network configuration diagram illustrating a communication system configuration according to this embodiment. A plurality of communication networks 210 and 220 conducts a communication with each other through a relay network 100. In this example, the communication networks 210 and 220 are installed in locations geographically distant from each other, for example, in a head office and branch offices of a company, or an operational base of a data center and its backup base. The implementation of the relay network 100 includes a local communication network (access network), and an intermediate- and long-distance communication network (metro/core network). The relay network 100 includes, for example, a signal relay function of supporting intercommunication between individual users or company users. In generally, the relay network 100 also has a function of providing a connection environment to the internet to the respective users, and is configured by a relatively large-scaled communication network. Therefore, the relay network 100 is frequently maintained by an infrastructure provider possessing the existing telephone network or power delivery network.

The communication networks 210 and 220 are frequently constructed as local area networks (LAN) managed for each of the bases. Communication protocols used within the LAN are configured by Ethernet in most cases. In recent years, in a part of communication networks, a multiprotocol label switching-transport profile (MPLS-TP) is also used. The packet communication based on the Ethernet is mainstream from a spread start of a computer communication to this day because ease of treatment is required within the LAN interior. In this embodiment, the Ethernet is assumed as an example of the communication protocol in the communication networks 210 and 220. On the other hand, the relay network 100 is generally configured by a high-speed long-distance communication network provided by a communication carrier, and uses a communication technique for a large-capacity communication such as SDH/SONET or OTN. In recent years, with the development of the packet communication technique such as the Ethernet or the MPLS-TP, the movement to apply the packet communication technique to the metro/core network is spread. In the description of this embodiment, an example in which the relay network 100 is configured by the Ethernet is assumed. In this embodiment, an arbitrary communication protocol can be applied to any one of the communication networks 210, 220, and the relay network 100. Not only the packet communication technique, but also a traditional line switching technique may be applied to a part of the communication networks 210, 220, and the relay network 100.

In FIG. 1, a time dissemination device 30 (hereinafter called "master clock") installed within the communication network 210 sets a time for a time receiving device 40 (hereinafter called "slave clock") within the communication network 220. Signals 1211, 1212, 1101, 1102, 1221, and 1222 represent a flow of a delay measurement packet used in measuring a reciprocating communication time between the master clock 30 and the slave clock 40.

The relay network 100 includes relay devices 10 and 20 (hereinafter called "delay control device") having a delay control function. The delay control devices 10 and 20 are located at positions ("edges" of the relay network 100) where the communication networks 210 and 220 are connected to the relay network 100, respectively, and occupy both ends of a relay path through which delay measurement packets 1101 and 1102 pass. In the drawing, the delay control device 10 relays the delay measurement packet 1211 received from the master clock 30 to the delay control device 20 as the signal 1101 within the relay network 100, and the delay control device 20 further transfers the packet 1101 as the delay measurement packet 1221 addressed to the slave clock 40. Similarly, the delay control devices 20 and 10 relay the delay measurement packets 1222, 1102, and 1212 which are response signals addressed to the master clock 30 from the slave clock 40, respectively.

The communication carrier that operates the relay network 100 is equipped with a carrier master clock 1000 which conducts the time synchronization processing on the delay control devices 10 and 20. That is, the delay control device 10 and the delay control device 20 are synchronized with each other with high precision according to the same time information source. The time information of the delay control devices 10 and 20 is retained in time information management units 11 and 21, and can be referred to in signal processing within the delay control devices 10 and 20 as occasion demands.

The relay network 100 is equipped with relay devices 91, 92 and 93 for relaying the delay measurement packets 1101 and 1102. Those relay devices have the same configuration as that of the related-art router or the L2 switch, and configure paths allowing signals (delay measurement packets 1101 and 1102, time information to be transmitted from the master clock 30 to the slave clock 40, or user data that passes through the path) transmitted and received between the delay control devices 10 and 20 to pass therethrough. In this embodiment, unlike the delay control devices 10 and 20, the relay devices 91, 92 and 93 do not need to be synchronized with the carrier master clock 1000. Because the delay control device 10 and the delay control device 20 do well to be synchronized with each other, the effects of suppressing an equipment investment such that the other relay devices 91, 92 and 93 having no synchronization function are used, or the existing router or L2 switch is utilized can be expected.

In order to conduct the high-precision reciprocating delay measurement between the master clock 30 and the slave clock 40, the delay control devices 10 and 20 are equipped with delay time setting databases 12 and 22 in this embodiment, respectively. The delay time setting database 22 of the delay control device 20 is used for designating a time at which the delay measurement packet 1101 to be transmitted from the master clock 30 to the slave clock 40 passes through the relay network 100. That is, when the delay control device 20 receives the delay measurement packet 1101, the delay control device 20 waits without transmitting the signal 1221 addressed to the slave clock 40 until a predetermined delay time for that packet elapses. The wait time at this time is a relative time determined on the basis of the time at which the delay measurement packet 1211 arrives at the relay network 100 (the detail will be described later). In order to realize a sequence of this processing, when the delay measurement packet 1211 arrives at the delay control device 10, the delay control device 10 records a receipt time, and inserts a time stamp of its receipt time into the delay measurement packet 1101, and transfers the delay measurement packet 1101 within the relay network 100. The delay control device 20 compares the time stamp of the delay measurement packet 1101 with the current time (standard time) of a time information management unit 21 in the delay control device 20 to determine a wait time of the packet within the delay control device 20 (the detail will be described later). After the wait time has elapsed, the delay control device 20 removes the time stamp allocated by the delay control device 10 from the packet, and transfers the delay measurement packet 1221 to the slave clock 40.

Likewise, the sequence of signals 1222, 1102, and 1212 directed from the slave clock 40 toward the master clock 30 are subjected to the delay control. That is, when the delay control device 20 receives the delay measurement packet 1222, the delay control device 20 inserts its receipt time as the time stamp into the packet, and transfers the packet as the delay measurement packet 1102 within the relay network 100. The delay control device 20 calculates the wait time with reference to the time stamp included in the receipt packet and the receipt time of the packet which is recorded by a time information management unit 11 of the delay control device 10. After the wait time has elapsed, the delay control device 20 removes the time stamp from the packet, and returns the delay control packet 1212 to the master clock 30.

The carrier master clock 1000 within the relay network 100 does not need to be synchronized with the master clock 30. To synchronize all of the relay network 100 and the communication networks 210, 220 over a wide area with each other is enormously expensive, and not realistic. In this embodiment, at least only the delay control devices 10 and 20 corresponding to the passing paths of the delay measurement packets 1101 and 1102 in the relay network 100 are time-synchronized with each other, and the respective delay control devices 10 and 20 do well to grasp the standard time.

In the general delay measurement protocol, after the reciprocating delay time has been measured, ½ of the measurement result is regarded as a one-way communication delay time, a time obtained by adding the one-way delay time to the standard time of the master clock 30 is notified as the setting time of the slave clock 40. Therefore, in order to enhance the measurement precision, there is a need to design the communication system so that the forward path delay time becomes equal to the return path delay time. In this embodiment, the setting values of the respective delay time setting databases 12 and 22 of the delay control devices 10 and 20 are determined to be equal to each other. The setting values are arbitrary if the setting values are equal between the forward path and the return path. However, in order to ensure the delay adjustment time, the setting values are set to have a margin for the required communication time of the normal data packet within the relay network 100.

The relay network 100 provides an information communication infrastructure in the wide area, and generally includes a plurality of management domains. In FIG. 1, as the simplest example, it is not uncommon that the relay network 100 is expressed by a single management domain. However, actually, the signal input from the communication network 210 to the relay network 100 further arrives at the communication network 220 through another relay network provided by another carrier, or another relay network provided by the same carrier. The delay control devices 10 and 20 corresponding to both ends of the relay network 100 are time-synchronized with each other with the use of the same time source or the respective time sources synchronized with each other with high precision to enable the operation of this embodiment.

Figure 2:
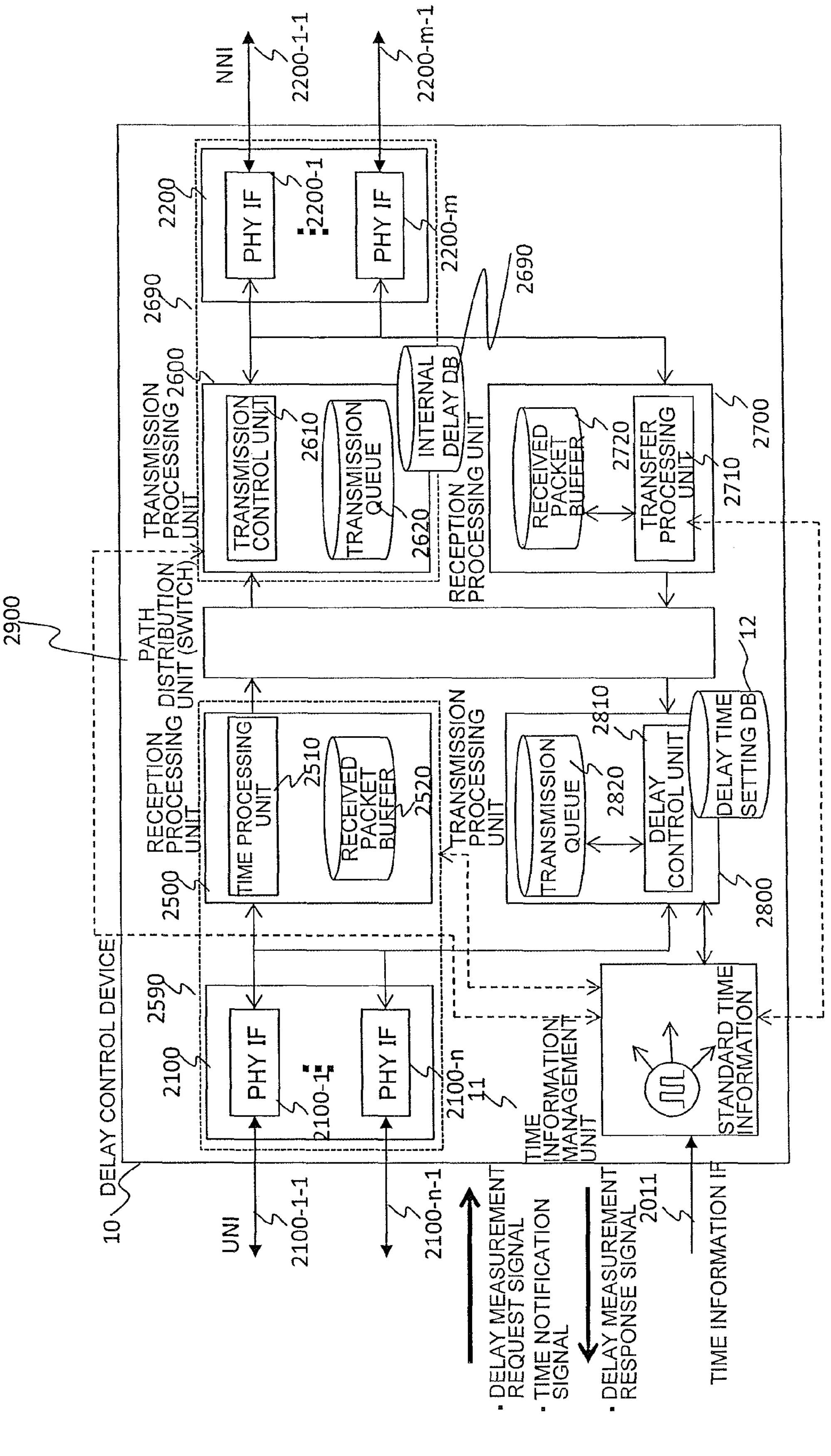
FIG. 2 is a functional block diagram illustrating a configuration example of a delay control device.

FIG. 2 is a functional block diagram illustrating a configuration example of the delay control device 10.

The delay control device 10 includes the time information management unit 11 that manages the time information, and the delay time setting database 12 in addition to the functions as the related-art communication device. A plurality of implementations is provided in an acquisition path of the time information. For example, when the IEEE 1588 stipulation is applied, the time information is received through the same interface as the data packet. Also, for example, when a GPS is applied, an interface with a GPS receiver may be provided in the delay control device 10, or the GPS receiver may be provided in the delay control device 10. Because the difference of this implementation does not affect the features of the present invention or this embodiment, in this drawing, an interface 2011 with an external time information supply device such as a GPS receiver is provided in addition to data packet interface units 2100 and 2200 as an example.

As an inter-device connection interface, a communication network 210 side interface (user-network interface (UNI)), and a relay network 100 side interface (network-network interface (NNI)) are each equipped with a plurality of physical ports (for example, Ethernet connector). In this drawing, the UNI interface unit 2100 is equipped with physical ports (PHY IF) 2100-1 to 2100-*n*, and the NNI interface unit 2200 is equipped with physical ports 2200-1 to 2200-*m*. In this configuration, a plurality of physical ports can be set for the respective physical ports. For example, in the case of the Ethernet, the physical ports can be realized with the use of a VLAN function. Under the circumstance, FIG. 2 illustrates a state in which one logical port is set for the respective physical ports as a simple configuration example.

The data packet received in the UNI (2100) is transferred from the NNI (2200) to the relay network 100 through a reception processing unit 2500, a switch unit (path distribution unit) 2900, and a transmission processing unit 2600. Also, the data packet input from the NNI (2200) is transferred from the UNI (2100) to the communication network 210 through a reception processing unit 2700, the switch unit 2900, and a transmission processing unit 2800.

Because the reception processing unit 2500, the transmission processing unit 2600, the reception processing unit 2700, and the transmission processing unit 2800 need to refer to the time information for processing the delay measurement packet, the standard time information can be acquired from the time information management unit 11. The standard time information managed by the time information management unit 11 is time information that is synchronized with the carrier master clock of FIG. 1.

Hereinafter, a flow of signal processing within the delay control device 10 will be described. In this example, a case in which the delay measurement packet is received is assumed.

The delay measurement packet can be distinguished from other (other than the delay measurement purpose) packets by, for example, that a path identifier such as a VLAN included in the packet (for example, in a header portion) is a delay measurement target path, or referring to a field by which the type of information included in the packet, which is representative of a type field within the packet, can be determined.

The reception processing unit 2500 stores the received delay measurement packets 1211 within a received packet buffer 2520. In this situation, the reception processing unit 2500 conducts detection processing of the delay measurement packet 1211 with reference to a preamble of the signal. At the same time, a time processing unit 2510 checks the standard time information within the delay control device 10 with the packet receiving timing within the delay control device 10, and acquires and records the packet reception time. Further, the time processing unit 2510 inserts the confirmed receipt time as the time stamp into the delay control packet. The delay measurement packet to which the time stamp is allocated is transmitted to the transmission processing unit 2600 through the switch unit 2900. A hardware configuration (refer to dotted portions in the figure) in which the reception processing units are integrated with the interface units is normally used. The switch unit 2900 associates a plurality of reception cards 2590 with a plurality of transmission cards 2690 according to destinations of the individual packets received from the UNI. In this drawing, in order to clarify the description of the operation, only a pair of configurations is illustrated. The same is applied to processing of the packet directed from the NNI toward the UNI.

In the transmission processing unit 2600, a transmission control unit 2610 conducts the distribution and transmission of the delay control packets received from the switch unit 2900. Specifically, the transmission control unit 2610 selects and transmits physical ports 2200-1 to 2200-*m* and logical ports 2200-1 to 2200-*m*−1 for transmitting the packet on the basis of a path table (not shown). If a large number of transmission packets are present, the transmission control unit 2610 stores transmission wait packets in a transmission queue 2620, and sequentially transmits the transmission wait packets as soon as a transmission band becomes empty.

Substantially the same is applied to the packets from the NNI (2200) toward the UNI (2100). There is no need to allocate the time stamp to the packet received from the NNI (2200) in the reception processing unit 2700. A transfer processing unit 2710 sequentially transfers the packets received from the NNI (2200) to the switch unit 2900. Also, the transmission processing unit 2800 allows the delay control packets received from the switch unit 2900 to wait within a buffer (transmission queue 2820) by a delay time prescribed in advance according to the delay time setting database 12. Thereafter, the transmission processing unit 2800 transmits the delay control packets. A delay control unit 2810 conducts the confirmation of the delay time of the delay measurement packet, a wait time management, and a transmission instruction from the transmission queue 2820 toward the UNI (2100).

Figure 3:
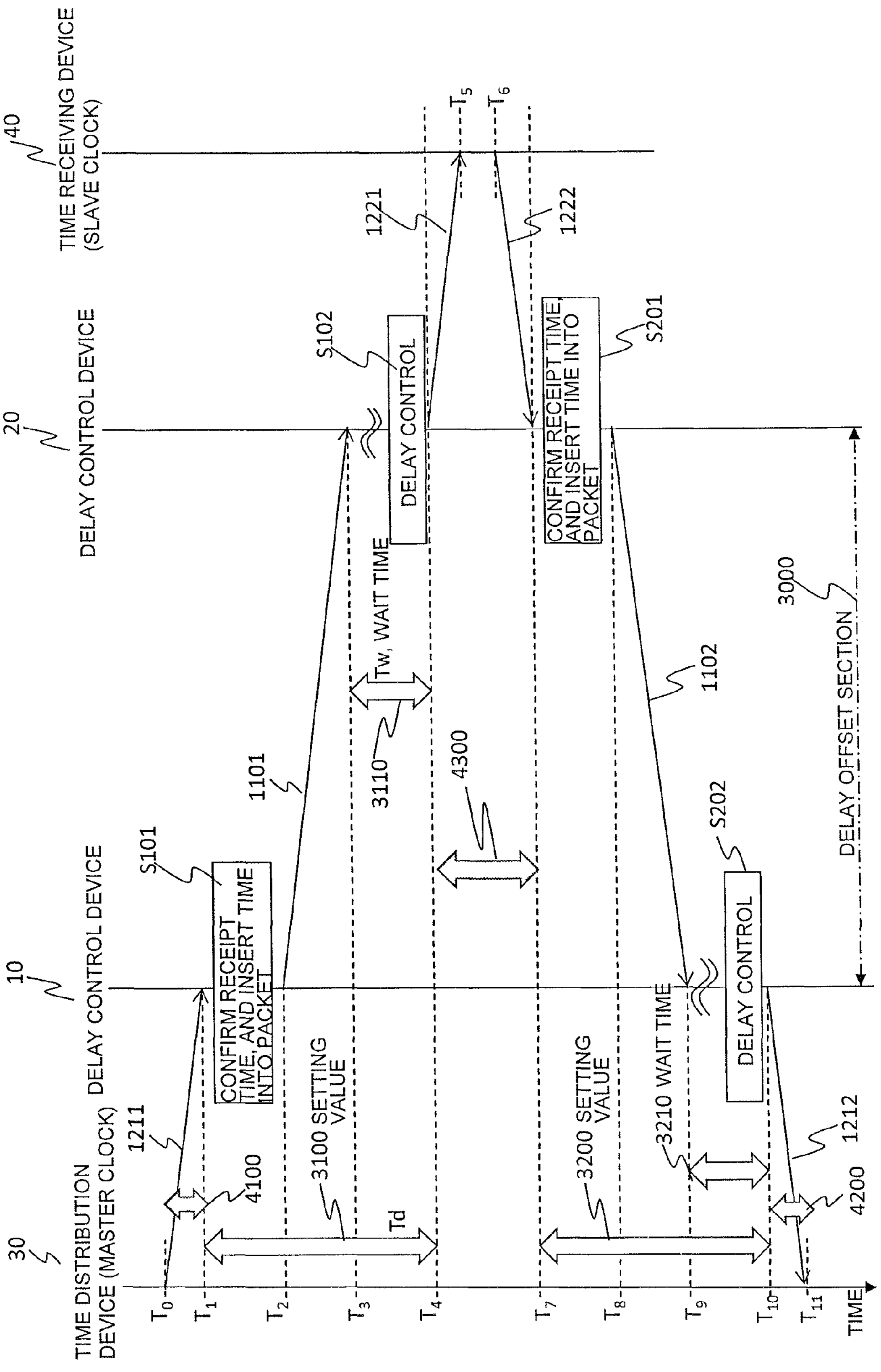
FIG. 3 is a sequence diagram illustrating a flow of a delay control for a delay measurement packet in a communication system according to this embodiment.

FIG. 3 is a sequence diagram illustrating a flow of the delay control for the delay measurement packet in the communication system according to this embodiment. FIG. 3 illustrates processing of the delay control packet by the master clock 30, the delay control device 10, the delay control device 20, and the slave clock 40 in FIG. 1.

The delay control device 10 allocates the receipt time as the time stamp to the delay measurement packet 1211 transmitted from the master clock 30 to the delay control device 10 (S101). Thereafter, the delay measurement packet 1101 transferred within the relay network 100 waits for a while for adjustment of the delay time under the delay control (S102) of the delay control device 20, and is then transmitted toward the slave clock 40. When the delay measurement packet 1222 returned by the slave clock 40 again enters the relay network 100, the time stamp is allocated to the delay measurement packet 1222 by the delay control device 20 as with the forward path (S201). Thereafter, the delay measurement packet 1222 is subjected to the delay control (communication time adjustment) (S202) in the delay control device 10, and returned to the master clock 30, and the reciprocating communication time is recorded in the delay measurement packet 1222 by the master clock 30.

The setting values of the respective communication delay times of the forward path and the return path, which are to be set in the delay control devices 20 and 10 in advance become a period 3100 (T4−T1) and a period 3200 (T10−T7) in the figure. That is, each of those setting values is a required time from a time at which the packet arrives at the relay network 100 to a time at which the packet goes out of the relay network 100. The delay control devices 20 and 10 obtain differences between those setting values set in the delay time setting databases 22 and 12, and a time really required for the received packet to pass through the relay network 100, respectively. Then, the delay control devices 20 and 10 allow the packet to remain within the delay control devices 20 and 10 for the difference time. Therefore, wait times 3110 and 3210 of the delay measurement packet within the delay control devices 20 and 10 are varied according to a communication situation (bandwidth utilization rate, presence or absence of a fault) within the relay network 100 as needed. The variation is absorbed by the delay control (S102, S202) in the delay control devices 20 and 10 so as not to affect the external. A wait time Tw 3110 (also 3210) within the delay control devices 20 and 10 is calculated by the following Expression (1).

$$Tw=Td-(T_3-T_1) \quad (1)$$

In this example, Td is a setting value of the delay time, $T_3$ is a receipt time, and $T_1$ is a time of the time stamp.

In the relay network 100, the delay time is controlled to be always kept constant as a communication offset section 3000. As a result, when viewed from the master clock 30, the indefiniteness of the communication time appears in only the external periods 4100, 4200, and 4300 outside the relay network 100. That is, the indefiniteness (fluctuation) of the communication time can be suppressed not depending on the absolute communication time necessary to pass through the relay network 100. In the time synchronization, not the amount of delay, but the indefiniteness of the measurement appears in a substantial error of the setting time. From this fact, the reciprocating times within the relay network 100 is rigidly unified to realize the time dissemination for remote locations with the same precision as that of a LAN.

Figure 4:
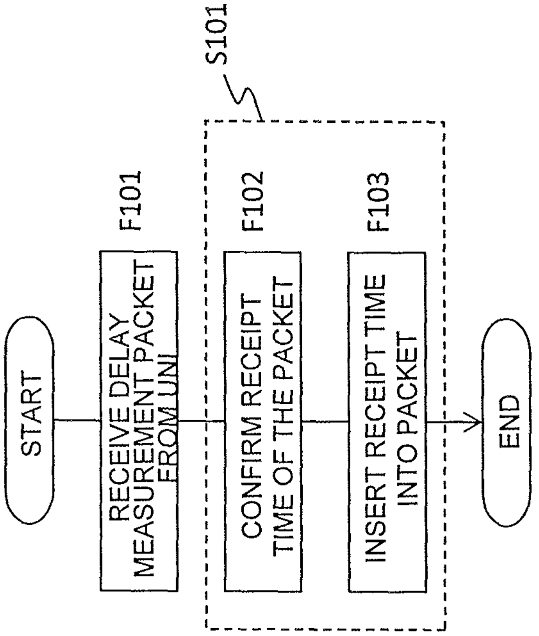
FIG. 4 is a flowchart illustrating the operation of a time processing unit in the delay control device.

FIG. 4 is a flowchart illustrating the operation of the time processing unit 2510 in the delay control device 10.

As described with reference to FIG. 3, when the time processing unit 2510 receives the delay measurement packet 1211 (F101), the time processing unit 2510 confirms the time information obtained from the time information management unit 11, and records the receipt time (F102). Further, in order to transmit the time to the delay control device 20, the time processing unit 2510 inserts the time as the time stamp into the delay measurement packet (F103). The processing S101 of FIG. 3 corresponds to F102 and F103 of this flowchart.

Figure 5:
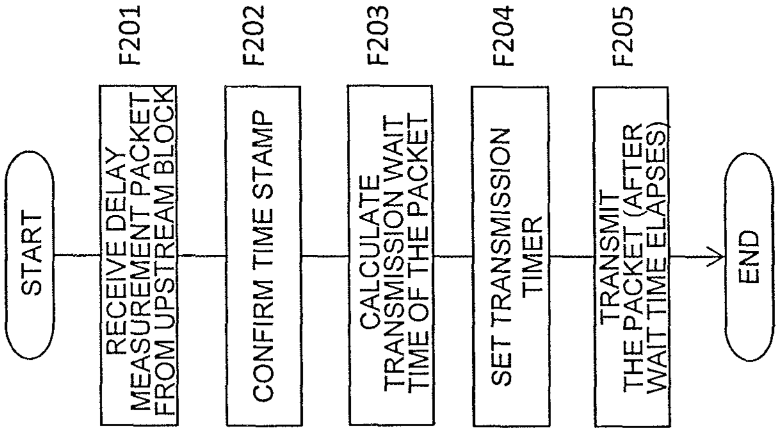
FIG. 5 is a flowchart illustrating the operation of a delay control unit in the delay control device.

FIG. 5 is a flowchart illustrating the operation of the delay control unit 2810 in the delay control device 10. When the delay control unit 2810 receives the delay measurement packet from the upstream reception processing unit 2700 through the switch unit 2900 (F201), the delay control unit 2810 first confirms the time stamp included in the delay measurement packet (F202). Then, the delay control unit 2810 extracts the setting value of the delay time set for the packet from the delay time setting database 12, and determines the wait time of the packet within the delay control device 10 through the above-mentioned Expression (1) with reference to the setting value, the time stamp included in the packet, and the receipt time of the packet which is obtained from the current time managed by the delay control device 10 (F203). As one unit for confirming the transmission timing, a method using a timer will be described below. The delay control unit 2810 sets the wait time from the current time to the transmission time in a timer (F204), transmits the packet at a timer completion time (F205), and completes a sequence of processing.

FIG. 6 is a table configuration diagram illustrating a setting example of a delay time setting DB 20 retained in the delay control device 10.

This table is designed to include a path identifier 601, a setting value (delay setting value) 602 of a path-based delay time, and a communication direction 603 indicative of the functions of the delay control device 10 in the path.

For example, in the case of the Ethernet, the path identifier 601 can identify the communication paths within the relay network 100 with the use of the VLAN ID. When an MPLS-TP is used for a transfer protocol, an MPLS label may be used as the path identifier. Because a plurality of VLAN or MPLS labels can be used at the same time, the path identifier 601 can also disclose the plurality of VLAN or MPLS labels. The delay setting value 602 is a setting value of the delay time for the path of the entry. In order to ensure a margin time in the delay time adjustment, the setting value is set to be larger than a passing time within the relay network 100 which is required for normal communication signal processing. The delay setting value 602 represents a relative time to a time at which the delay measurement signal is input to the relay network 100, and is indicative of a period (elapsed time from the relay start time) in which the delay measurement signal is present within the relay network 100. The delay setting value 602 may be an arbitrary value. However, when it is conceived to reduce the wait time within the relay network 100, and effectively use a resource of the relay network 100 (that is, a buffer or a communication bandwidth provided by the communication device such as the delay control device), it is desirable to select a minimum value where the same delay setting value 602 can be applied to both of the forward path 1101 and the return path 1102, or a value closer to the minimum value. The communication direction 603 represents a field indicative of a situation (send) in which the delay control device 10 transmits a signal to the relay network 100 in the path identifier 601, or a situation (recv) in which the delay control device 10 receives the signal from the relay network 100. If the delay control device 10 transmits the signal to the relay network 100, there is no need to allocate the time stamp to the communication signal to conduct the delay control in the delay control device 10. Under the circumstances, the delay setting value 602 is set to "0". On the other hand, when the delay control device 10 receives the signal including the time stamp, the delay control device 10 determines the wait time within the delay control device 10 through the above-mentioned Expression (1) with reference to the delay setting value 602, the time stamp, and the time at which the delay control device 10 receives the signal with reference to the table 12.

Figure 7:
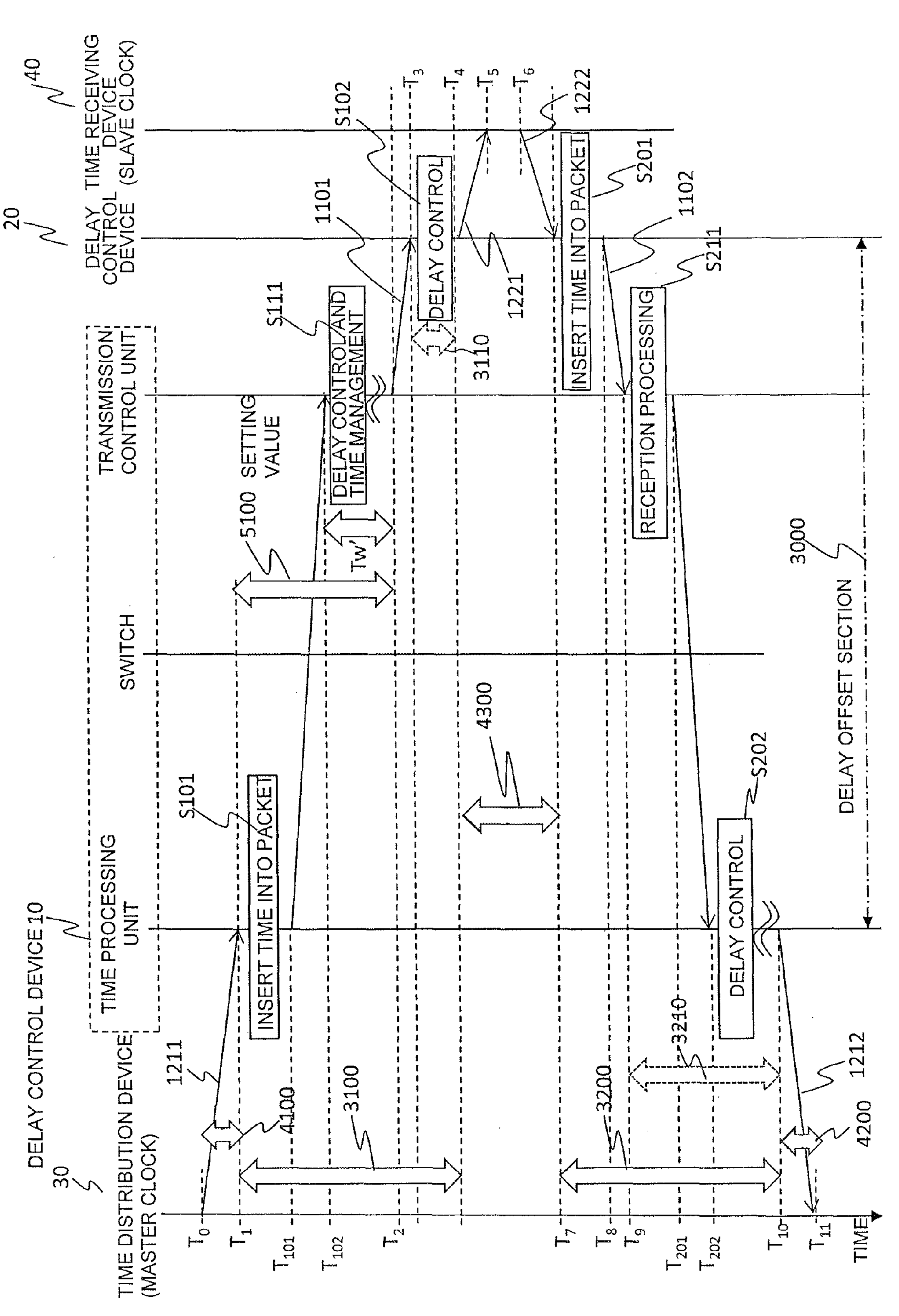
FIG. 7 is a sequence diagram illustrating another delay control method in the communication system of FIG. 1.

FIG. 7 is a sequence diagram illustrating another delay control method in the communication system of FIG. 1. The system configuration requirements such as the delay control devices 10, 20, the master clock 30, and the slave clock 40 are identical with those in FIG. 3. In this example, a method of controlling a delay time within the delay control devices 10 and 20 will be described with reference to the internal delay DB 2690 in a functional block diagram of FIG. 2. A measurement section from the master clock 30 to the slave clock 40 is reduced as compared with a delay measurement (FIG. 3) for all the paths from the receipt time of the delay measurement packet 1211 to the output time of the measurement signal 1212 in the delay control device 10. As a result, the time measurement precision is improved. Therefore, as described with reference to FIG. 6, when the delay time within the relay network 100 is to be reduced, it is expected to improve an estimate precision of the delay time necessary for this system. Further, as a result of improving the measurement precision, an error in the time setting for the slave clock 40 can be reduced. Hereinafter, differences from FIG. 3 will be described.

The internal delay database 2690 is a database in which a time at which the transmission processing unit 2600 of the delay control device 10 corresponding to an inlet of the relay network 100 transmits the delay measurement packet is indicated by a relative elapsed time from the time at which the transmission processing unit 2600 receives the packet. In this example, information on the delay time setting value recorded in the database represents a duration of a period 5100.

When the transmission control unit 2610 in the transmission processing unit 2600 receives a delay measurement packet including the time stamp, the transmission control unit 2610 compares the time stamp of the packet with the current time, and retains the delay measurement packet without transferring the packet until a preset in-device delay time elapses (S111).

In this embodiment, the delay control unit 2810 corresponding to an outlet side of the relay network 100 in the return path conducts the same processing as that in FIG. 3 (S202). Processing of confirming the receipt time at the time of receiving the delay measurement packet from the relay network 100 is necessary to calculate the transmission time (the same as that in FIG. 3). In this drawing, receipt time confirmation processing is indicated by reception processing S211.

The setting values of the internal delay database are set to be equal between the forward path and the return path. In this way, when a required time on the transmission side within the delay control devices 10 and 20 is prescribed, the fluctuation of the processing time caused by the instability factor within the devices, that is, a variation of a processing load or a variation of the number of received packets is removed as compared with the method described in FIG. 3. This results in an advantage of improving the precision of the setting time to be notified to the slave clock 40.

The number of logical lines that accommodate the users on the access network side is larger than a core network side using an optical multiplexing transmission in the communication carrier network. In the access network, because the packets are transferred in a packet communication system in which the respective logical lines are independent (not multiplexed) from each other, the packet concentration cannot be predicted in the user side interface unit 2100, the reception processing unit 2500, the transmission processing unit 2600, and the NNI side interface unit 2200 of the delay control device 10. As a result, it is assumed that the fluctuation of the transfer delay is liable to be generated as compared with another transmission device within the relay network 100. Under the circumstances, as illustrated in the figure, an error of the processing time within the delay control device 10 closer to the user is suppressed with the result that the communication delay time through the relay network 100 can be measured with higher precision.

Figure 8:
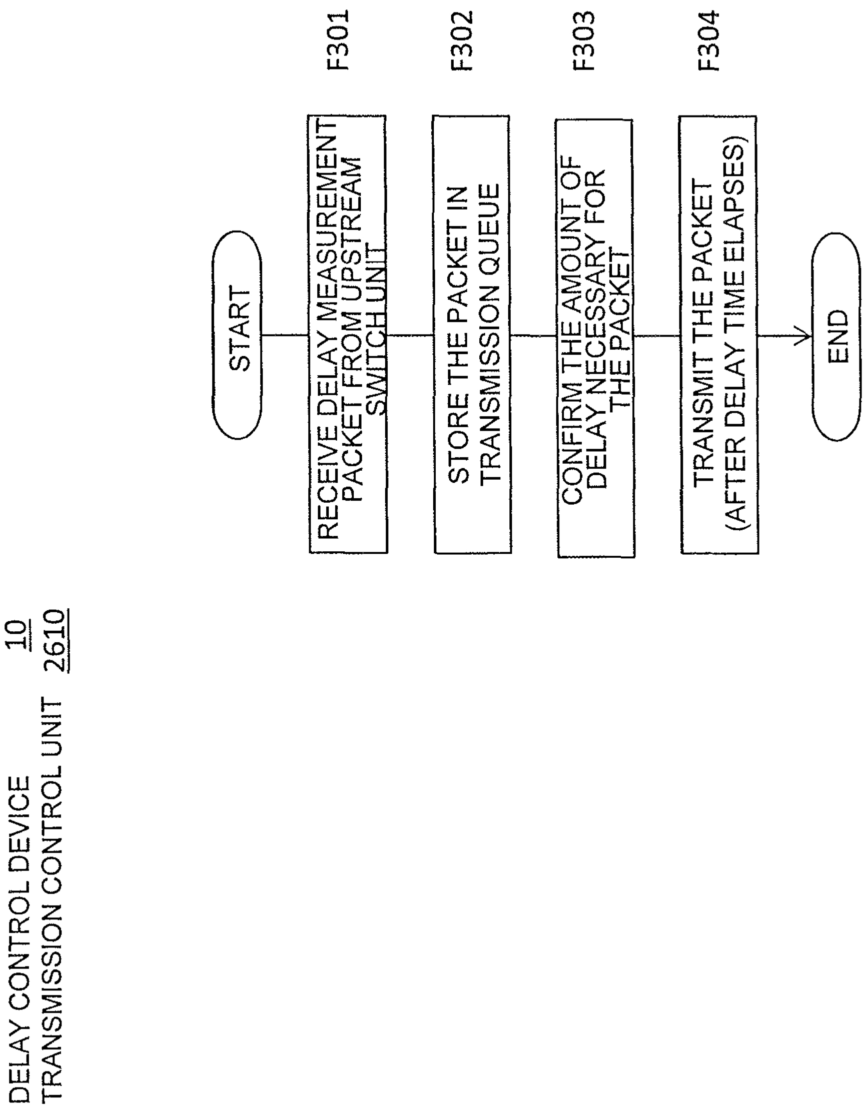
FIG. 8 is a flowchart illustrating the operation of a transmission control unit of the delay control device in the sequence of FIG. 6.

FIG. 8 is a flowchart illustrating the operation of the transmission control unit 2610 in the delay control device 10 in the sequence of FIG. 6.

When the transmission control unit 2610 receives the packet with the time stamp through the switch unit 2900 (F301), the transmission control unit 2610 confirms a destination of the packet, and stores the packet in the transmission queue 2620 as described in FIG. 2 (F302). Thereafter, the transmission control unit 2610 confirms the amount of delay to be allocated to the packet with reference to the internal delay database 2690 (F303), and transmits the packet after the wait time has elapsed (F304). A wait time Tw' can be obtained through the above-mentioned Expression (1) by the following expression.

$$Tw' = Td - (T_{102} - T_1)$$

In this example, Td is a setting value of the delay time, $T_{102}$ is a receipt time, and $T_1$ is a time of the time stamp.

In this example, the internal delay times are unified between the forward path and the return path with the result that the communication section in which the communication time is uncertain can be partially removed.

FIG. 9 is a table configuration diagram illustrating a set example of the internal delay DB (2690) in the delay control device 10.

The configuration of this table is identical with the table configuration example of FIG. 6 except for an internal delay setting value 902. Under the circumstance, in the following description, a description of a path identifier 901 and a communication direction 903 will be omitted. If the communication direction 903 is "send", the delay control device 10 allocates a delay corresponding to the internal delay setting value 902 to the packet by the transmission control unit 2610. Therefore, the delay control device 10 transmits the packet through the path 1101. The internal delay setting value 902 is set as a relative time to the time at which the delay measurement packet 1211 is received. The operation and a wait time calculation method in the transmission control unit 2610 are identical with the operation of the delay control unit 2810 described in FIG. 6.

Second Embodiment

In this embodiment, let us consider a case in which one master clock conducts a time distribution to a plurality of slave clocks. In this case, there is a possibility that the wait time allocated to the delay measurement packet by the delay control device 10 is different depending on a difference in the combination of the master clock with the slave clocks (passing path of the delay measurement packet within the relay network 100). Under the circumstance, the delay control device 10 located on the master clock side of the relay network 100 needs a function of changing the delay time according to the combination of the master clock with the slave clock.

As a method of setting the delay time in each combination of the master clock with the slave clock, two ways of each connection and each device are logically conceived. In the former, as illustrated in the first embodiment, the method of setting the delay time by the delay setting database and the internal delay database has been described with reference to FIGS. 6 and 9. Under the circumstance, in this embodiment, a method of setting the delay time on the device basis will be described.

In the following description, a case in which the time synchronization of two slave clocks is conducted is assumed as the simplest example.

Figure 10:
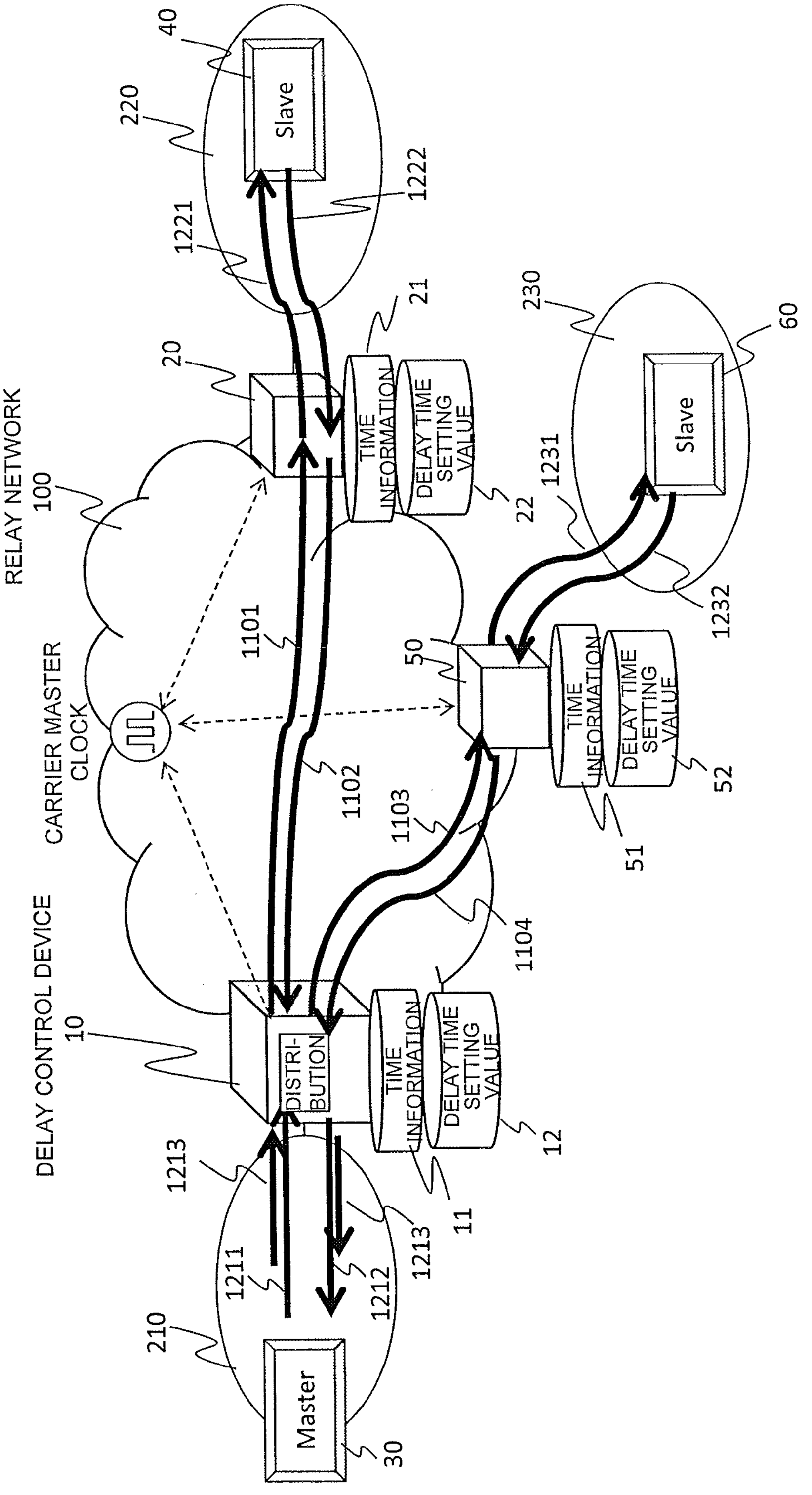
FIG. 10 is a network diagram illustrating a configuration example of a time dissemination system when two slave clocks are present at the same time.

FIG. 10 is a network diagram illustrating a configuration example of a time dissemination system when two slave clocks are present at the same time.

A configuration of a communication network 230 including a slave clock 60 is identical with that of the communication network 220. Also, a delay control device 50 which is an edge device on the communication network 230 side of the relay network 100 includes a time management unit 51 and a delay time setting database 52, and its function is identical with the block configuration of FIG. 2. The relay devices 91, 92 and 93 described in FIG. 3 is omitted in this drawing.

A portion different in operation from the case of FIG. 3 or 6 resides in the delay control unit 2810 of the delay control device 10 which conducts the delay control of the forward path. The delay control unit 2810 identifies a path through which the delay measurement packet passes with reference to the header information of the delay measurement packet received from the switch unit 2900. The transmission processing unit 2800 includes the delay time setting database 12 associated with the path identifier. The setting values in the delay time setting database 12 may be different according to the passing path within the relay network 100. The delay time sufficiently larger than a time necessary for the normal data packet to pass through the relay network 100 may be set for all of the paths. On the other hand, taking the efficiency of the delay measurement into account, an optimum value can be set for each of the paths.

In this situation, the delay control unit 2810 extracts the path identifiers from header information, and calculates the wait time necessary for each of the received packets on the basis of the identifiers.

The sequence in the delay control method according to the second embodiment can employ the sequence of the delay control method illustrated in FIG. 3 and so on, and the sequence of another delay control method illustrated in FIG. 7 and so on.

Figure 11:
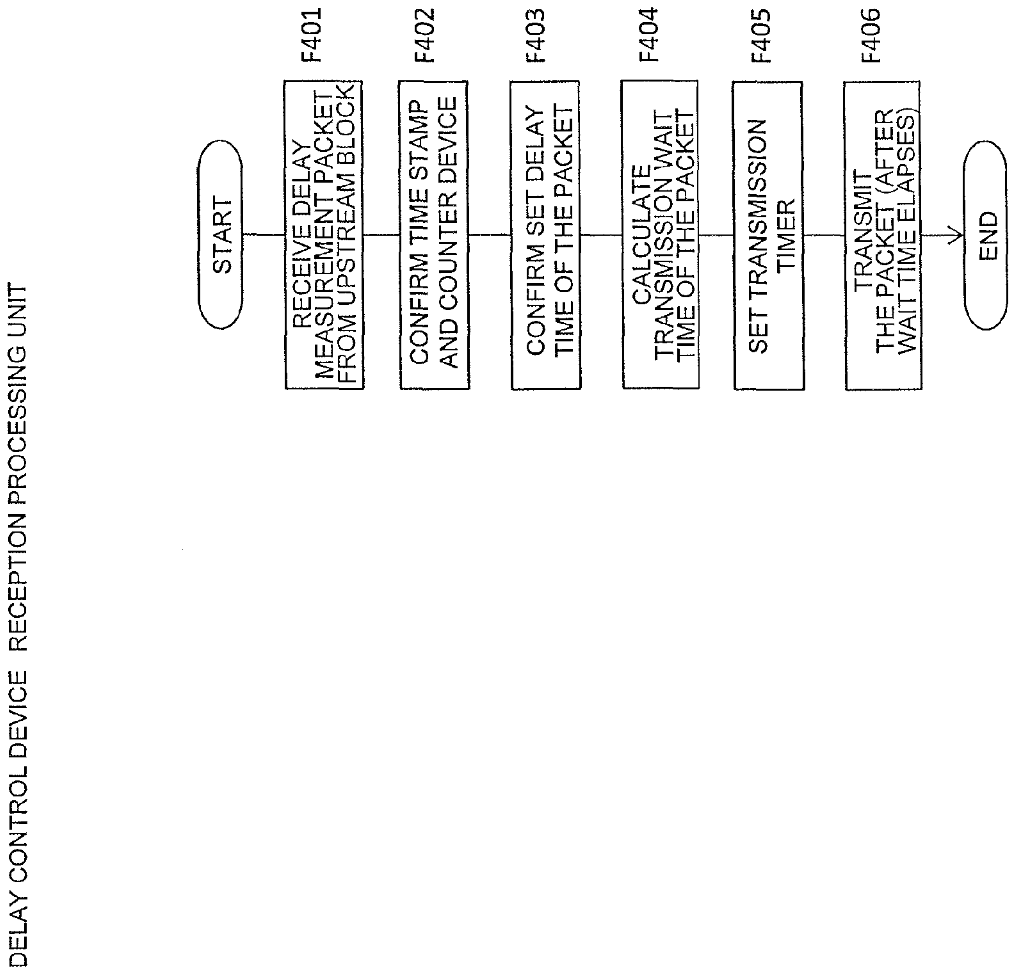
FIG. 11 is a flowchart illustrating the operation in the delay control unit of the delay control device.

FIG. 11 is a flowchart illustrating the operation in the delay control unit of the delay control unit 2810.

After the delay control unit 2810 has received the delay measurement packet (F401), the delay control unit 2810 identifies a path in which the packet is to be measured (in this case, a counter delay control device connected to the delay control device 10) from the header information of the packet (F402). The delay control unit 2810 refers to the delay time setting database 12 on the basis of the extracted path information, and extracts the wait time within the relay network 100 which is set for the packet in advance (F403). The wait time can be obtained through the above-mentioned Expression (1). Processing subsequent to F404 is identical with the processing subsequent to F203 in FIG. 5, and therefore its description will be omitted.

FIG. 12 is a table configuration diagram illustrating a set example of a delay time setting DB (20) and an internal delay DB (2690) in the delay control device 10.

The configuration of this table is identical with the table configuration example of FIGS. 6 and 9 except for device identifiers 12001 and 12011. Under the circumstances, in the following description, a delay setting value 12002, an internal delay setting value 12012, and communication directions 12003, 12013 will be omitted from the description.

The delay time setting database 20 is referred to when the delay is adjusted by the delay control unit 2810, and a device identifier 12001 is used as a search key for extracting the delay time setting value 12002 in that case. The internal delay database 2690 is referred to when a delay corresponding to the internal delay setting value 902 is given by the transmission control unit 2610 in the embodiment of FIGS. 7 to 9. Likewise, the device identifier 12011 is used as a search key when reading the internal delay setting value 12012 from the table. The operation of the delay processing and the wait time calculation method are identical with those described in FIGS. 6 and 9, and therefore their description will be omitted.

3. Configuration Example

According to one aspect of the present invention and/or this embodiment, there is provided a communication system including:

a first communication network including an information dissemination device;

a second communication network including a terminal device;

a relay network that is connected to the first communication network and the second communication network, and relays communication signals of the first communication network and the second communication network;

a first delay control device that is disposed at a first interconnection point that connects the first communication network and the relay network; and a second delay control device that is disposed at a second interconnection point that connects the relay network and the second communication network, in which the first and second delay control devices have a function of distinguishing a first communication signal directed from the information dissemination device toward the terminal device through the relay network, and a second communication signal directed from the terminal device toward the information dissemination device from other communication signals within the relay network, respectively, the first and second delay control devices further have a function of retaining the first and second time information, respectively, and the first and second delay control devices further have a function of controlling a first communication time since the first communication signal received from the first communication network passes through the relay network until the first communication signal passes through the second delay control device, and a second communication time since the second communication signal received from the second communication network passes through the relay network until the second communication signal passes through the first delay control device.

In the above-mentioned communication system, the first and second time information are set for the first and second delay control devices on the basis of the same high-precision time sources, respectively.

In the above-mentioned communication system, the first and second delay control devices can further provide a function of allocating first and second communication times independent from each other to the first and second communication signals, respectively, and a function of setting the respective communication times in association with each other.

In the above-mentioned communication system, the first and second delay control devices can further provide a function of controlling the first communication time and the second communication time to be the same time.

In the above-mentioned communication system, the information dissemination device can have a function of managing standard time information, and a time notification function to the terminal device, and the first and second communication signals are a delay time measurement signal for measuring a reciprocating communication time to the terminal device, which is issued by the information dissemination device, or a time notification signal issued by the information dissemination device to the terminal device.

In the above-mentioned communication system, the first and second communication signals are a delay measurement signal or a time notification signal conforming to a high-precision time protocol PTP of IEEE 1588.

In the above-mentioned communication system, the second and first delay control devices can have a function of calculating a relative elapsed time to a first arrival time at which the first communication signal arrives from the information dissemination device to the first delay control device, or a second arrival time at which the second communication signal arrives from the terminal device to the second delay control device, a function of holding the first and second communication signals over the first and second communication times, and a function of transferring the first and second communication signals to the terminal device and the information dissemination device after the first and second communication times have elapsed from the first and second arrival times, respectively.

In the above-mentioned communication system, the second and first delay control devices can have a function of acquiring the first and second arrival times as time stamps inserted into the first and second communication signals by the first to second communication devices.

In the above-mentioned communication system, the first delay control device can have an internal wait time control function that regulates a delay within the device so that an elapsed time is kept constant from the first arrival time until the first communication signal is transmitted from the first delay control device before the first communication signal is transmitted to the relay network.

In the above-mentioned communication system, the first and second delay control devices can have interfaces belonging to the first and second communication networks, and providing interconnection functions between the first communication network and the relay network, and between the second communication network and the relay network, respectively.

In the above-mentioned communication system, the first and second delay control devices can have interfaces installed at end points close to the first and second communication networks within the relay network, and providing interconnection functions between the first communication network and the relay network, and between the second communication network and the relay network, respectively.

4. Advantages of the Embodiment

In time notification from the time dissemination device to the terminal device, there is a need to grasp a communication time (delay time) from the time dissemination device to the terminal device. In this situation, the delay time necessary to reciprocate the signal between both of those devices is measured. However, in general, a communication situation (communication path/delay/congestion) is different between the forward path and the return path, and an influence of the fluctuation of the communication time cannot be avoided. With the use of the communication system according to the present invention, a forward delay time and a return delay time can be always held constant, and a fluctuation of a delay time (total value) of the forward path and the return path, which is measured by a clock incorporated into the time dissemination device, can be reduced. As a result, the high-precision time synchronization using the PTP can be realized without depending on the geographical distance even in the respective communication networks that are extensively distributed. That is, the influence of the delay time which exponentially increases according to the communication distance, and its instability (fluctuation) can be factually completely avoided.

5. Additional Statements

The present invention is not limited to the above embodiments, but includes various modified examples. For example, in the above-mentioned embodiments, in order to easily understand the present invention, the specific configurations are described. However, the present invention does not always provide all of the configurations described above. Also, apart of one configuration example can be replaced with another configuration example, and the configuration of one embodiment can be added with the configuration of another embodiment. Also, in a part of the respective configuration examples, another configuration can be added, deleted, or replaced.

Also, parts or all of the above-described respective configurations, functions, processors, processing means may be realized, for example, as an integrated circuit, or other hardware. Also, the above respective configurations and functions may be realized by allowing the processor to interpret and execute programs for realizing the respective functions. That is, the respective configurations and functions may be realized by software. The information on the program, table, and file for realizing the respective functions can be stored in a storage device such as a memory, a hard disc, or an SSD (solid state drive), or a storage medium such as an IC card, an SD card, or a DVD.

Also, the control lines and the information lines necessary for description are illustrated, and all of the control lines and the information lines necessary for products are not illustrated. In fact, it may be conceivable that most of the configurations are connected to each other.

What is claimed is:

1. A communication system comprising:

a first communication network including a time dissemination device;

a second communication network including a time receiving device;

a relay network that is connected to the first communication network and the second communication network, and relays communication signals of the first communication network and the second communication network;

a first delay control device that is disposed at a first interconnection point that connects the first communication network and the relay network;

a second delay control device that is disposed at a second interconnection point that connects the relay network and the second communication network; and a high-precision time source that sets the same time information for the first delay control device and the second delay control device, wherein, when the first delay control device receives a first communication signal which is a delay time measurement signal in a forward path extending from the time dissemination device toward the time receiving device through the relay network, the first delay control device inserts a reception time into the first communication signal as a first reception time, and transfers the first communication signal, the second delay control device, according to a second reception time at which the first communication signal is received, the first reception time extracted from the first communication signal, and a predetermined first delay setting value, obtains a first wait time from a difference between the first delay setting value, and a time difference between the second reception time and the first reception time, when the second delay control device receives a second communication signal which is a delay time measurement signal in a return path extending from the time receiving device toward the time dissemination device, the second delay control device inserts a reception time into the second communication signal as a third reception time, and transfers the second communication signal, the first delay control device, according to a fourth reception time at which the second communication signal is received, the third reception time extracted from the second communication signal, and the same first delay setting value as that of the first communication signal, obtains a second wait time from a difference between the first delay setting value, and a time difference between the fourth reception time and the third reception time, and the first delay control device and the second delay control device conduct a delay control of packet transfer by the second wait time and the first wait time, respectively, to transmit the communication signals in the same delay time as the first delay setting value in the forward path and the return path.

2. The communication system according to claim 1, wherein the first delay control device comprises:

a time processing unit; and a transmission control unit, when the time processing unit of the first delay control device receives the first communication signal, the time processing unit inserts a reception time as a fifth reception time into the first communication signal, and transfers the first communication signal to the transmission control unit, the transmission control unit, according to a sixth reception time at which the first communication signal is received, the fifth reception time extracted from the first communication signal, and a predetermined second delay setting value, obtains a third wait time from a difference between the second delay setting value, and a time difference between the sixth reception time and the fifth reception time, and the first delay control device conducts a delay control of packet transfer by the third wait time.

3. The communication system according to claim 1, wherein the first delay control device includes a first delay time setting DB that stores a path identifier, a path-based delay setting value and a communication direction in association with each other, and obtains the first delay setting value with reference to the first delay time setting DB.

4. The communication system according to claim 2, wherein the first delay control device includes a second delay time setting DB that stores a device identifier, a path-based delay setting value and a communication direction in association with each other, and obtains the first delay setting value with reference to the second delay time setting DB.

* * * * *